March 7, 1944.  R. BECHMANN ET AL  2,343,738

PIEZOELECTRIC CRYSTAL MOUNTING

Filed July 19, 1941

INVENTORS
Rudolf Bechmann, H.E. Kurdt,
and Heinrich Bremer
BY
H.S.Grover
ATTORNEY Patented Mar. 7, 1944

2,343,738

UNITED STATES PATENT OFFICE 2,343,738

PIEZOELECTRIC CRYSTAL MOUNTING

Rudolf Bechmann, Heinz E. Kundt, and Heinrich Bremer, Berlin, Germany; vested in the Alien Property Custodian Application July 19, 1941, Serial No. 403,096
In Germany April 2, 1940

9 Claims. (Cl. 171—327)

This invention relates to a new and useful supporting or mounting means for long-wave piezo-electric crystals.

An object of this invention is to provide improved mounting or holding apparatus for long-wave piezo-electric crystals wherein damping effects are minimized.

Heretofore in the mounting of long-wave crystals, it has been suggested to suitably metallize the two major surfaces of a piezo-electric crystal and then mount a single rigid metal stem to one of the major surfaces for supporting the crystal. The assembly of crystal, electrode and stem is in turn supported by suitable means secured to the stem. Such apparatus is disclosed in the Bremer et al. Patent 2,310,612, issued February 9, 1943. This patent describes the soldering of a crystal plate to a rigid metal stem at a nodal point on the crystal. The stem forms the support for the crystal. This method and apparatus for supporting crystals are best suited for low frequency contour crystals which are excited so as to undergo longitudinal vibrations along major dimensions. The natural period of such oscillations or vibrations is governed, as a practical matter, by the diameter of the crystal, if circular, or the length of a side or edge, if rectangular or square.

Hence, it would appear that these natural longitudinal vibrations are dependent only upon the dimensions of the crystal plane or electrode surface and not upon the thickness of the crystal plates. However, it will be found that oscillations of small amplitude do arise in the thickness direction of the crystal and these are due to complex couplings within the crystal element or plate. The thickness oscillations are propagated along the supporting stem or stud and cause undesirable damping of the crystal. To overcome such damping is a further object of this invention and it is effected, as will be explained in greater detail hereinafter, by supporting the stem at a selected point which will permit free oscillations of the crystal with a minimum of damping.

This invention will be further described with reference to the accompanying drawing in which.

Figure 1:
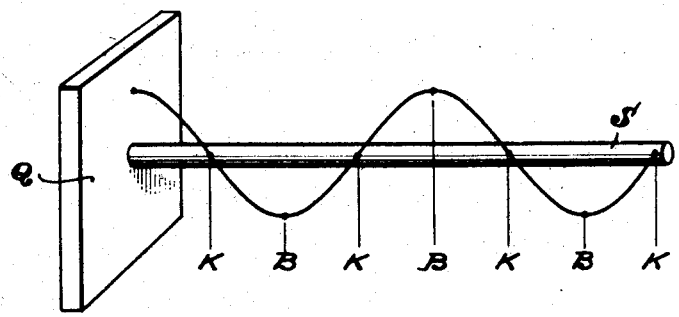
Fig. 1 is a perspective view of a crystal to which is fastened a supporting stud or stem. The curve drawn on the stem represents a standing wave set up thereon by thickness oscillations of the crystal.

Referring now to the accompanying drawing, Fig. 1 illustrates a pestle, stem or stud S which is soldered to the quartz plate or crystal Q or to a metallized surface thereof serving as an electrode. On the stem S, for a finite length, there arises a standing wave having nodes at points indicated by K and loops or anti-nodes at points marked B. This standing wave is set up by thickness vibrations of the crystal even though the same is operating in or along another dimension. If, then, stem S is supported at one place, for instance, which happens to lie in the vicinity of a loop, the support or mounting means S will also be excited to experience vibrations inasmuch as the crystal holder or mounting system is by its construction in fixed coupling relation with the crystal. This entails incidental frequency changes and a rise in the damping of the vibrating system, as compared with a freely vibrating crystal. This action, as has been ascertained experimentally, arises not only in the case of longitudinally vibrating crystals where mechanical coupling with the holder results from the longitudinal transversal contraction coefficient of the crystal, but also arises with transversal vibrations of the crystal in which case the crystalline plates exhibit also a certain interaction coefficient, that is, the cross shearing coefficient.

Now, according to the present invention, the disadvantage of reduced amplitude of desired oscillations caused by the damping effect of the support on the crystal and other difficulties hereinbefore described are overcome by supporting or holding the stem S at a nodal point K of the standing wave arising along the stem. It will be found expedient in this connection to make the range or dimension of the clamp required for holding the stem at such points as narrow as possible, that is, so narrow that it may be regarded as very small compared with a half wavelength of the wave arising on the stem.

Figure 2:
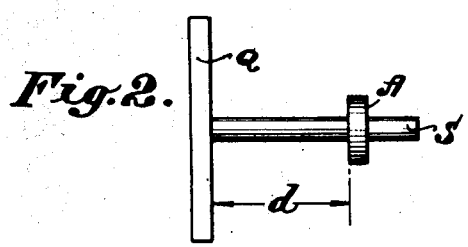
Fig. 2 is a side elevation of a crystal, supporting stem and clamp for the stem.
Figure 3:
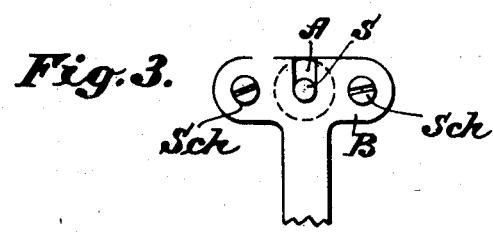
Fig. 3 is an end view of a portion of the clamp for the stem.

A simple exemplified embodiment of the basic idea underlying this invention is shown in Fig. 2 of the appended drawing where the stem S has a cylindrical extension A which is located at a nodal point of the standing wave developed on the stem. The distance $d$ between crystal plate Q and the portion of enlarged diameter or crosspiece A is therefore roughly one quarter or three quarters of a wavelength. More generally the distance $d$ is made an odd multiple of a quarter wavelength, the wavelength taken being that of the standing wave set up upon the stem S. In this way the reaction of such a holder or mounting system turns out to be particularly small especially where the cylindrical extension A, as shown in Fig. 3, is laterally clamped in. For instance, the extension A of stem S is clamped or tensionally held between two sheets or laminae B which are pressed together by the screws Sch.

Figure 4:
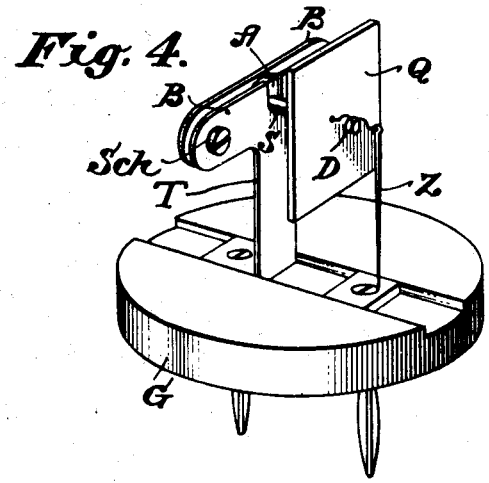
Fig. 4 is a perspective view of a complete crystal holder employing the principles and features of this invention.

An exemplified embodiment of a completely mounted crystal along the line of the above disclosure in shown in Fig. 4. The support T which bears the stem with a cylindrical extension piece is secured upon a base plate G. The electrical connection to one of the two metallized surfaces of the crystal is established through the said support T and the stem S. Connection to the other metallized crystal electrode surface is made, for example, through a supply lead wire Z, and a slender wire D which is soldered fast to a metal surface on crystal Q and to the connecting wire Z.

What is claimed is:

1. A piezo-electric crystal holder comprising a crystal plate, a rigid stem secured to one face of said crystal plate and means located at a nodal point of vibration on said stem for supporting said crystal in an operative position to provide improved operation.

2. A piezo-electric crystal holder comprising a crystal plate, a rigid stem secured to one face of said crystal plate and a cylindrical extension member located at a nodal point of vibration on said stem for supporting said crystal in an operative position to provide improved operation.

3. A piezo-electric crystal holder comprising a crystal plate, a rigid stem secured to one face of said crystal plate and a cylindrical extension member located at a nodal point of vibration on said stem, a supporting sheet having means for engaging said cylindrical extension member for supporting said crystal in an operative position to provide improved operation.

4. A piezo-electric crystal holder comprising a crystal plate, a rigid stem secured to one face of said crystal plate, a wire secured to the other face of said crystal plate, and means located at a nodal point of vibration on said stem for supporting said crystal in an operative position to provide improved operation.

5. A piezo-electric crystal holder comprising a crystal plate, a rigid stem secured to one face of said crystal plate, a wire secured to the other face of said crystal plate, and means located at a point on said stem, which point is approximately an odd multiple of one-quarter wave length to which the crystal is normally responsive distant from said crystal, said means being provided for supporting said crystal in an operative position to provide improved operation.

6. A piezo-electric crystal holder comprising a crystal plate having two metallized surfaces, a rigid stem secured to one of said metallized surfaces, a wire secured to the other metallized surface of said crystal, and supporting means located at a point on said stem, said point being removed from said crystal at a distance which is approximately an odd multiple of a quarter wave length to which the crystal is normally responsive.

7. Piezo-electric apparatus comprising a crystal plate, a rigid stem physically secured to one of the surfaces of said crystal, said stem acting as a support for the crystal plate and being mechanically vibrated by vibrations of said crystal whereby a mechanical standing wave is set up on said stem, instrumentalities for clamping and supporting said stem at a nodal point of mechanical vibration on said stem, and means for establishing electrical connection with a pair of electrode faces of said crystal plate.

8. Piezo-electric apparatus comprising a crystal plate, a rigid stem physically secured to one of the electrode faces of said crystal, said stem acting as a support for the crystal plate and being vibrated by mechanical vibrations of said crystal whereby a standing mechanical wave is set up on said stem, apparatus for clamping and supporting said stem at a point substantially an odd multiple of a quarter wavelength of said mechanical wave away from said surface to which said stem is secured, and means including said stem for establishing electrical connection with the electrode surfaces of said crystal plate.

9. Apparatus as claimed in the preceding claim characterized by the fact that the clamping means for said stem extend along the stem for a distance which is small relative to a quarter wavelength of the standing mechanical wave.

RUDOLF BECHMANN.
HEINRICH BREMER.
HEINZ E. KUNDT.